United States Patent
Kanaya et al.

(10) Patent No.: US 7,932,967 B2
(45) Date of Patent: Apr. 26, 2011

(54) BRIGHTNESS ENHANCEMENT FILM-LAMINATED LIGHT DIFFUSER PLATE AND METHOD FOR PRODUCING THE SAME

(75) Inventors: Hiroko Kanaya, Niihama (JP);
Akiyoshi Kanemitsu, Niihama (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 236 days.

(21) Appl. No.: 12/402,562

(22) Filed: Mar. 12, 2009

(65) Prior Publication Data

US 2009/0237595 A1    Sep. 24, 2009

(30) Foreign Application Priority Data

Mar. 18, 2008  (JP) .................................. 2008-069864

(51) Int. Cl.
*G02F 1/1335* (2006.01)
*G02B 5/02* (2006.01)
*F21V 7/04* (2006.01)

(52) U.S. Cl. ........................... 349/64; 359/599; 362/627

(58) Field of Classification Search .................. None
See application file for complete search history.

(56) References Cited

U.S. PATENT DOCUMENTS

| 5,289,351 | A | * | 2/1994 | Kashima et al. | 362/627 |
|---|---|---|---|---|---|
| 5,944,405 | A | * | 8/1999 | Takeuchi et al. | 362/617 |
| 6,963,451 | B2 | * | 11/2005 | Se et al. | 359/599 |
| 7,156,546 | B2 | * | 1/2007 | Higashiyama | 362/561 |
| 7,656,473 | B2 | * | 2/2010 | Ha et al. | 349/64 |
| 7,802,905 | B2 | * | 9/2010 | Kanaya et al. | 362/339 |
| 2007/0177386 | A1 | * | 8/2007 | Masaki et al. | 362/296 |
| 2007/0273975 | A1 | * | 11/2007 | Toshima et al. | 359/599 |
| 2008/0153008 | A1 | * | 6/2008 | Hayashi et al. | 430/2 |
| 2008/0259243 | A1 | * | 10/2008 | Ohta et al. | 349/64 |
| 2009/0116916 | A1 | * | 5/2009 | Qiu | 408/158 |
| 2010/0091374 | A1 | * | 4/2010 | Iwata et al. | 359/599 |

FOREIGN PATENT DOCUMENTS

| JP | 2003-315545 A | 11/2003 |
|---|---|---|
| JP | 2004-170937 A | 6/2004 |

* cited by examiner

*Primary Examiner* — Tina M Wong
(74) *Attorney, Agent, or Firm* — Sughrue Mion, PLLC

(57) ABSTRACT

The present invention provides a brightness enhancement film-laminated light diffuser plate which can sufficiently prevent scratching, and also can ensure sufficient brightness. The brightness enhancement film-laminated light diffuser plate of the present invention includes a brightness enhancement film 41, and a light diffuser plate 31 comprising a transparent material and a light diffusing agent dispersed in the transparent material, and having a rough surface having a ten-point average roughness (Rz) of more than 40~m and 100~m or less on at least one surface, wherein the brightness enhancement film 41 is laminated and integrated on the rough surface 31a of the light diffuser plate via an adhesive layer 40.

7 Claims, 1 Drawing Sheet

BRIGHTNESS ENHANCEMENT FILM-LAMINATED LIGHT DIFFUSER PLATE AND METHOD FOR PRODUCING THE SAME

BACKGROUND OF THE INVENTION

1. Field of the Invention

The present patent application claims priority under the Paris Convention based on Japanese Patent Application No. 2008-069864 (filed on Mar. 18, 2008), and the entire content of the aforementioned application is herein incorporated by reference.

The present invention relates to a brightness enhancement film-laminated light diffuser plate which can sufficiently prevent scratching, and also can ensure sufficient brightness, and a method for producing the same.

2. Description of the Related Art

In this specification and claims, a ten-point average roughness (Rz) is a value measured in accordance with JIS B0601-1994.

BACKGROUND ART

Known liquid crystal displays include, for example, a liquid crystal display with a configuration in which a surface light source apparatus as a backlight is disposed at the back side of a liquid crystal panel (image display section) equipped with a liquid crystal cell. A surface light source apparatus functioning as the backlight includes a surface light source apparatus with a configuration in which plural light sources are disposed in a lamp box (casing) and also a light diffuser plate is disposed at the front side of these light sources (refer to JP-A-2004-170937).

It is required that such a surface light source apparatus for a backlight sufficiently diffuses light from the light source and enables high transmittance of light, thus making it possible to illuminate a crystal panel at a high brightness. In order to meet these requirements, there is described a surface light source apparatus with a configuration in which a brightness enhancement film is laminated on a light diffusing adhesive material having adhesion itself (refer to JP-A-2003-315545).

In the surface light source apparatus with the above configuration, since the light diffuser plate and the brightness enhancement film are laminated and integrated, the light diffuser plate and the brightness enhancement film do not rub against each other and scratching can be sufficiently prevented. However, brightness was not sufficiently improved.

SUMMARY OF THE INVENTION

In light of such a technical background, the present invention has been made and an object thereof is to provide a brightness enhancement film-laminated light diffuser plate which can sufficiently prevent scratching, and also can ensure sufficient brightness, and a method for producing the same.

In order to achieve the above object, the present invention provides the following means.

[1] A brightness enhancement film-laminated light diffuser plate comprising:
a brightness enhancement film, and
a light diffuser plate comprising a transparent material and a light diffusing agent dispersed in the transparent material, and having a rough surface having a ten-point average roughness (Rz) of more than 40 μm and 100 μm or less on at least one surface,
wherein the brightness enhancement film is laminated and integrated on the rough surface of the light diffuser plate via an adhesive layer.

[2] The brightness enhancement film-laminated light diffuser plate according to the above-described [1], wherein the brightness enhancement film is a reflection type polarized light separating film.

[3] A surface light source apparatus comprising the brightness enhancement film-laminated light diffuser plate according to the above-described [1] or [2], and plural light sources disposed at the back side of the light diffuser plate, wherein the brightness enhancement film is disposed at the front side in the light diffuser plate.

[4] A liquid crystal display comprising the brightness enhancement film-laminated light diffuser plate according to the above-described [1] or [2], plural light sources disposed at the back side of the light diffuser plate, and a liquid crystal panel disposed at the front side of the light diffuser plate, wherein the brightness enhancement film is disposed at the front side in the light diffuser plate.

[5] A method for producing a brightness enhancement film-laminated light diffuser plate, which comprises the steps of:
producing a light diffuser plate comprising a transparent material and a light diffusing agent dispersed in the transparent material, and having a rough surface having a ten-point average roughness (Rz) of more than 40 μm and 100 μm or less on at least one surface,
producing a laminated film comprising a brightness enhancement film and an adhesive layer laminated on one surface of the brightness enhancement film, and
laying the rough surface of the light diffuser plate and the adhesive layer of the laminated film one upon another so as to contact with each other, thereby laminating and integrating the light diffuser plate and the laminated film.

In the invention of [1], since a light diffuser plate and a brightness enhancement film are laminated and integrated via an adhesive layer, the light diffuser plate and the brightness enhancement film do not rub against each other and the occurrence of scratching in a brightness enhancement film-laminated light diffuser plate can be sufficiently prevented. Although the brightness enhancement film is laminated and integrated on a rough surface of the light diffuser plate via the adhesive layer, since this rough surface is formed as a rough surface having a ten-point average roughness (Rz) of more than 40 μm and 100 μm or less, an air layer (air section) exists between an irregular-shaped bottom of the rough surface of the light diffuser plate and the adhesive layer and thus brightness is sufficiently ensured by existence of the air layer. Since the contact surface with the adhesive layer in the light diffuser plate is formed on the rough surface having a ten-point average roughness (Rz) of more than 40 μm and 100 μm or less, the adhesive layer is prevented from contacting with the irregular-shaped bottom of the rough surface of the light diffuser plate. As a result, the air layer (air section) is formed between the light diffuser plate and the adhesive layer.

In the invention of [2], since a reflection type polarized light separating film is used as the brightness enhancement film, there is an advantage that the brightness of a surface light source apparatus and a liquid crystal display constituted using the brightness enhancement film-laminated light diffuser plate can be further improved.

In the invention of [3], there is provided a surface light source apparatus in which a brightness enhancement film-laminated light diffuser plate is free from scratching, and also enables emission of high-quality light and has high brightness.

In the invention of [4], there is provided a liquid crystal display in which a brightness enhancement film-laminated light diffuser plate is free from scratching, and also enables formation of high-quality images and has high brightness.

According to the invention of [5], a brightness enhancement film-laminated light diffuser plate of the present invention can be produced with good productivity.

BRIEF DESCRIPTION OF THE REFERENCE SYMBOLS

Figure 1:
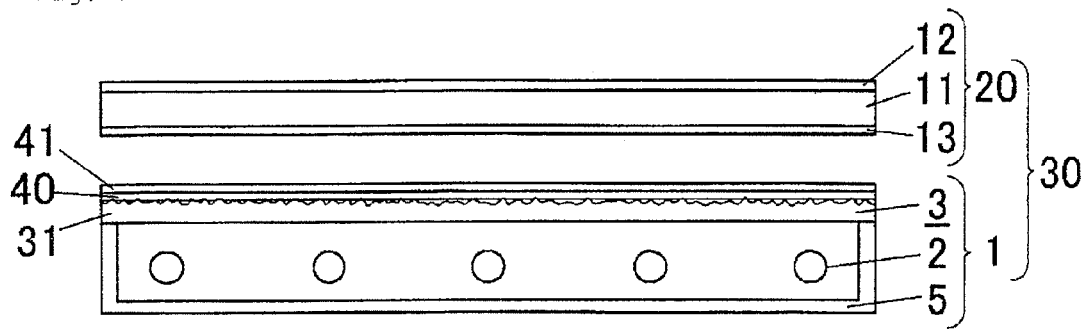
FIG. 1 is a schematic view showing one embodiment of a liquid crystal display according to the present invention.

1: Surface light source apparatus
2: Light source
3: Brightness enhancement film-laminated light diffuser plate
20: Liquid crystal panel
30: Liquid crystal display
31: Light diffuser plate
31a: Rough surface
40: Adhesive layer
41: Brightness enhancement film
42: Laminated film
43: Air layer

DETAILED DESCRIPTION OF THE INVENTION

One embodiment of the liquid crystal display according to the present invention is shown in FIG. 1. In FIG. 1, reference numeral (30) denotes a liquid crystal display, (11) denotes a liquid crystal cell, (12) and (13) denote polarizer plates, and (1) denotes a surface light source apparatus (backlight). Polarizer plates (12) and (13) are disposed on top and bottom sides of the liquid crystal cell (11) and a liquid crystal panel (20) as an image display section is composed of these constituent members (11), (12) and (13). The liquid crystal cell (11) preferably includes materials capable of displaying a color image.

The surface light source apparatus (1) is disposed on the lower side (back side) of the bottom side polarizer plate (13) of the liquid crystal panel (20). That is, this liquid crystal display (30) is a transmission type liquid crystal display.

The surface light source apparatus (1) comprises a lamp box (5) of a thin box configuration having a rectangular shape in plan view which is open on the top side (front side), plural light sources (2) disposed at a distance from each other in the lamp box (5), and a brightness enhancement film-laminated light diffuser plate (3) disposed on the upper side (front side) of plural linear light sources (2). The brightness enhancement film-laminated light diffuser plate (3) is secured onto the lamp box (5) so as to close the opening on the front side of the lamp box. On the inside surface of the lamp box (5), a light reflection layer (not shown) is formed. In the present embodiment, a linear light source such as a cold cathode ray tube is disposed as the light source (2).

Figure 2:
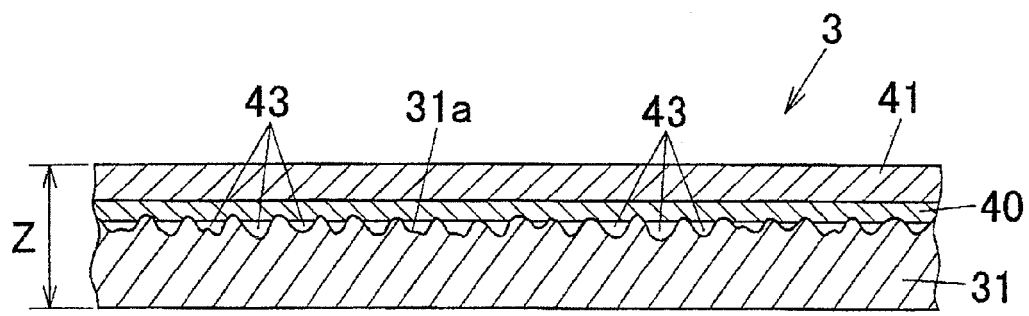
FIG. 2 is a sectional view showing one embodiment of a brightness enhancement film-laminated light diffuser plate according to the present invention.

As shown in FIG. 2, the brightness enhancement film-laminated light diffuser plate (3) comprises a light diffuser plate (31), a brightness enhancement film (41) and an adhesive layer (40) which are disposed in parallel to each other. The light diffuser plate (31) comprises a transparent material and a light diffusing agent dispersed in the transparent material, and has a rough surface (31a) having a ten-point average roughness (Rz) of more than 40 µm and 100 µm or less on at least one surface (refer to FIG. 2 and FIG. 3). The brightness enhancement film (41) is bonded onto the rough surface (31a) of the light diffuser plate (31) via the adhesive layer (40) and an air layer (air section) (43) is formed between an irregular-shaped bottom (recess section) of the rough surface (31a) of the light diffuser plate (31) and the adhesive layer (40) (refer to FIG. 2). Usually, the adhesive layer (40) is tightly laminated on the nearly entire one surface of the brightness enhancement film (41).

In the liquid crystal display (30), the brightness enhancement film (41) of the brightness enhancement film-laminated light diffuser plate (3) is disposed at the front side (liquid crystal panel (20) side) (refer to FIG. 1). In other words, in the liquid crystal display (30), the light diffuser plate (31) of the brightness enhancement film-laminated light diffuser plate (3) is disposed at the back side (light source (2) side) (refer to FIG. 1).

Regarding the brightness enhancement film-laminated light diffuser plate (3) with the above configuration, since the light diffuser plate (31) and the brightness enhancement film (41) are laminated and integrated via the adhesive layer (40), the light diffuser plate (31) and the brightness enhancement film (41) do not rub against each other and the occurrence of scratching in the brightness enhancement film-laminated light diffuser plate (3) can be sufficiently prevented. Since the contact surface with the adhesive layer (40) in the brightness enhancement film-laminated light diffuser plate (3) with the above configuration is formed on the rough surface (31a) having a ten-point average roughness (Rz) of more than 40 µm and 100 µm or less, as shown in FIG. 2, an air layer (air section) (43) exists between an irregular-shaped bottom (recess section) of the rough surface (31a) of the light diffuser plate (31) and the adhesive layer (40), thus making it possible to illuminate at high brightness in the front direction (direction of the normal) in the surface light source apparatus (1) and to display images at high brightness in the front direction (direction of the normal) in the liquid crystal display (30).

In the present invention, a plate-shaped molding comprising a transparent material and a light diffusing agent dispersed in the transparent material is used as the light diffuser plate (31).

The transparent material is not particularly limited and, for example, inorganic glass and a transparent resin are used. The transparent resin is preferably a transparent thermoplastic resin in view of ease of molding. Examples of the transparent thermoplastic resin include, but are not limited to, a polycarbonate resin, an ABS resin (an acrylonitrile-butadiene-styrene copolymer), a methacryl resin, a methyl methacrylate-styrene copolymer resin, a polystyrene resin, an acrylonitrile-styrene copolymer (AS) resin, and a polyolefin resin such as a polyethylene resin or a polypropylene resin.

The light diffusing agent is not particularly limited as long as it is a particle (including a powder) which is incompatible with the transparent material and shows a refractive index which is different from that of the transparent material, and also has a function of diffusing transmission light which transmits the light diffuser plate (31). The light diffusing agent may be either an inorganic particle made of an inorganic material, or an organic particle made of an organic material.

Examples of the inorganic material constituting the inorganic particle include, but are not limited to, silica, calcium carbonate, barium sulfate, titanium oxide, aluminum hydroxide, inorganic glass, mica, talc, white carbon, magnesium oxide and zinc oxide.

Examples of the organic material constituting the organic particle include, but are not limited to, methacrylic crosslinked resins, methacryl-based high-molecular weight resins, styrene-based crosslinked resins, styrene-based high-molecular weight resins and siloxane-based polymers.

The particle diameter of inorganic and organic particles to be used as the light diffusing agent is usually from 0.1 to 50 μm.

The amount of the light diffusing agent varies depending on the objective degree of diffusion of transmission light and is usually from 0.01 to 20 parts by mass, and preferably from 0.1 to 10 parts by mass, based on 100 parts by mass of the transparent resin.

At least one surface of the light diffuser plate (31) is formed on the rough surface (31a) having a ten-point average roughness (Rz) more than 40 μm and 100 μm or less. When Rz is 40 μm or less, the adhesive layer (40) is likely to contact with the bottom (recess section) of the rough surface (31a) of the light diffuser plate (31) and it is difficult to sufficiently ensure the amount of cavity of the air layer (43). In contrast, when Rz is more than 100 μm, sufficient lamination strength cannot be ensured.

The rough surface (31a) can be formed by the following manner. In the case of producing a light diffuser plate by multi-layer coextrusion, a light diffuser plate (31) having the above specific rough surface (31a) on at least one surface can be produced by adding particles having a large particle diameter (matting agent) to the surface layer. Alternatively, the above specific rough surface (31a) can be imparted by performing melt-extrusion transfer molding using a mat roll in the case of extrusion molding of the light diffuser plate (31).

The thickness (S) of the light diffuser plate (31) is usually set within a range from 0.1 to 10 mm. The size (area) of the light diffuser plate (31) is not particularly limited and varies depending on the size of the objective surface light source apparatus (1) and the liquid crystal display (30), and is usually designed in the size measuring 20 cm×30 cm–150 cm×200 cm.

In this invention, the above brightness enhancement film (41) is normally formed from a transparent resin, and includes but is not limited to a reflection type polarized light separating film or a prism film.

The reflection type polarized light separating film (41) has a property of transmitting a certain kind of polarized light and reflecting polarized light having a reverse property. Specific examples thereof include a reflection type linear polarized light separating film which transmits linear polarized light in a specific oscillation direction and reflects linear polarized light in a direction perpendicular to the direction, and a reflection type circular polarized light separating film which transmits circular polarized light in a certain rotary direction and reflects circular polarized light rotating in a reverse direction. Examples of commercially available reflection type polarized light separating film include "Dual Brightness Enhancement Film (DBEF) manufactured by 3M Co." and "NIPOX" manufactured by Nitto Denko Corporation.

The prism film (41) is usually made of a transparent material and is not particularly limited and includes, for example, a sheet in which a light collecting microlens such as a prism microlens, a convex microlens or a lenticular lens is disposed over the entire surface of the opposite side of the side to be laminated with the light diffuser plate (31). This prism film illustrates the front side at high brightness by collecting light transmitted while diffusing the light diffuser plate (31) in the normal direction.

It is possible to usually use, as the prism film (41), films made of base materials such as thermoplastic resins, for example, a polycarbonate resin, an ABS resin (an acrylonitrile-butadiene-styrene copolymer), a methacryl resin, a methyl methacrylate-styrene copolymer resin, a polystyrene resin, an acrylonitrile-styrene copolymer (AS) resin, and a polyolefin resin such as a polyethylene resin or a polypropylene resin. Examples of commercially available prism film (41) include, but are not limited to, "Brightness Enhancement Film (BEF, trade name)" (comprising a polyester film having a thickness of 125 μm and an acryl-based resin layer having a thickness of 30 μm formed on the polyester film, V-shaped grooves having a vertical angle of 90° and a depth of 25 μm being formed at a pitch of 50 μm on the acryl-based resin layer) manufactured by Sumitomo 3M Limited., "ESTINA (trade name)" manufactured by Sekisui Film Co,. Ltd., and "Illuminex ADF Film (trade name)" manufactured by GE Plastics Co.

The thickness (T) of the brightness enhancement film (41) is usually from 0.02 to 5 mm, and preferably from 0.02 to 2 mm.

In the present invention, the material of the adhesive layer (40) is not particularly limited and examples thereof include tackiness agents such as acryl-based adhesives, urethane-based adhesives, polyether-based adhesives and silicone-based adhesives, and adhesives other than these adhesives. Among these adhesives, colorless and transparent adhesives are preferably used since high-quality images can be formed. As the material of the adhesive layer (40), a pressure-sensitive adhesive is preferably used.

The thickness (M) of the adhesive layer (40) is preferably set within a range from 1 to 30 82 m. When the thickness is 1 μm or more, sufficient lamination strength can be ensured. In contrast, when the thickness is 30 μm or less, it is possible to sufficiently prevent the adhesive layer (40) from contacting with the bottom (recess section) of the rough surface (31a) of the light diffuser plate (31) and to sufficiently ensure the amount of cavity of the air layer (43). It is particularly preferred that the thickness (M) of the adhesive layer (40) is set within a range from 5 to 25 μm.

Figure 3:
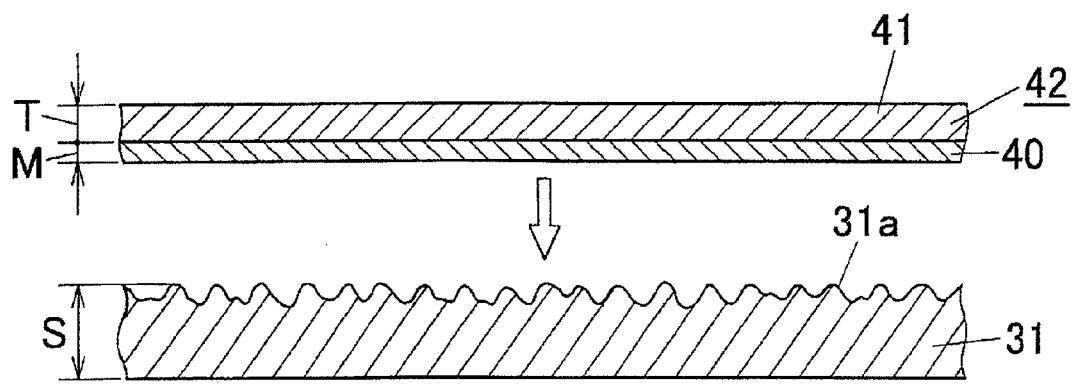
FIG. 3 is a sectional view showing a method for producing a brightness enhancement film-laminated light diffuser plate according to the present invention.

In order to prevent the adhesive layer (40) from contacting with the bottom (recess section) of the rough surface (31a) of the light diffuser plate (31), for example, the adhesive layer (40) is uniformly formed over the entire laminated surface of the brightness enhancement film (41) to obtain a laminated film (42) and, as shown in FIG. 3, the brightness enhancement film (41) and the light diffuser plate (31) are laid one upon another in an aspect in which the adhesive layer (40) faces the rough surface (31a) of the light diffuser plate (31), followed by pressing.

The entire area in the plane view of the air layer (air section) (43) is usually set to 10% or more, and preferably 30% or more, based on the entire area in the plane view of the brightness enhancement film-laminated light diffuser plate (3) since it is possible to illuminate the front side at high brightness. The entire area is usually set to 90% or less, and preferably 70% or less in view of lamination strength of the brightness enhancement film (41) and the light diffuser plate (31).

When the entire area in the plane view of the air layer (43) is large, the lamination strength may decrease. In such a case, the following configuration may be employed. Namely, the size of the light diffuser plate (31) is set to be larger than the screen size of the liquid crystal display (30) and the brightness enhancement film (41) is laminated on the light diffuser plate (31) in a state where the adhesive layer is sufficiently contacted with the irregular-shaped bottom (state where no cavity exists) only at the peripheral portion (region which deviates from the screen) of the light diffuser plate (31). For example, by increasing the thickness of the adhesive layer (40) at the peripheral portion (region which deviates from the screen) of the light diffuser plate (31), the adhesive layer (40) at the peripheral portion can be laminated by sufficiently contacting with the irregular-shaped bottom.

It is also possible to employ the configuration in which the brightness enhancement film (41) is fixed to the light diffuser plate (31) by a frame (not shown) at the peripheral portion of the brightness enhancement film-laminated light diffuser plate (3).

The thickness (Z) of the brightness enhancement film-laminated light diffuser plate (3) is not particularly limited and is usually set within a range from 1 to 4 mm.

The brightness enhancement film-laminated light diffuser plate (3) is produced, for example, by the following manner. Namely, the adhesive layer (40) is laminated on one surface of a brightness enhancement film (41) by applying an adhesive agent one surface of the brightness enhancement film (41) to obtain a laminated film (refer to FIG. 3). In contrast, a light diffuser plate (31) having a rough surface (31a) having a ten-point average roughness (Rz) of more than 40 μm and 100 μm or less on one surface is produced. As shown in FIG. 3, the light diffuser plate (31) and the laminated film (42) are laid one upon another so that the adhesive layer (40) is contacted with the rough surface (31a) of the light diffuser plate (31), followed by pressing. Thus, the light diffuser plate (31) and the adhesive layer (40) are bonded to obtain the brightness enhancement film-laminated light diffuser plate (3) of the present invention as shown in FIG. 2.

In the above method, since the rough surface (31a) of the light diffuser plate (31) has a ten-point average roughness (Rz) of more than 40 μm and 100 μm or less, an air layer (air section) (43) exists between the irregular-shaped bottom (recess section) of the rough surface (31a) of the light diffuser plate (31) and the adhesive layer (40) and thus brightness is sufficiently ensured by the existence of the air layer (43). By using an adhesive having comparatively high viscosity as the adhesive constituting the adhesive layer (40) and/or decreasing the pressure in the case of pressing, it is possible to sufficiently prevent the adhesive layer (40) from contacting with the bottom (recess section) of the rough surface of the light diffuser plate (31).

The above method is for illustrative purposes only and the brightness enhancement film-laminated light diffuser plate (3) of the present invention is not limited to those produced by the method.

In the brightness enhancement film-laminated light diffuser plate (3) of the above embodiment, there was employed a configuration that the brightness enhancement film (41) is laminated only on one surface of the light diffuser plate (3) via the adhesive layer (40). However, there is no restriction on the configuration. For example, it is possible to employ a configuration that the brightness enhancement film (41) is laminated on both surfaces of the light diffuser plate (3) via the adhesive layer (40). In this case, both surfaces of the light diffuser plate (3) are preferably formed as the rough surface having a ten-point average roughness (Rz) of more than 40 μm and 100 μm or less, while at least another surface must be formed as the rough surface having a ten-point average roughness (Rz) of more than 40 μm and 100 μm or less.

In the surface light source apparatus (1) and the liquid crystal display (30) of the present invention, examples of the light source (2) to be used include, but are not limited to, linear light sources such as fluorescent tubes, halogen lamps and tungsten lamps, and spot light sources such as light emitting diodes (LED).

The brightness enhancement film-laminated light diffuser plate (3), the surface light source apparatus (1) and the liquid crystal display apparatus (30) of the present invention are not limited to those of the embodiments described above, and any design variations within the scope of the claims may be made without deviating from the spirit of the invention.

EXAMPLES

Specific examples of the present invention will now be described, but the present invention is not limited to the following examples.

Example 1

Production of Light Diffusing Agent Master Batch

After 54 parts by mass of styrene resin pellets ["HRM40" manufactured by TOYO-STYRENE CO., LTD., refractive index: 1.59], 40 parts by mass of acryl-based polymer particles [crosslinked polymer particles "Sumipex XC1A" manufactured by Sumitomo Chemical Co., Ltd., refractive index: 1.49, volume average particle diameter: 25 μm], 4 parts by mass of siloxane-based polymer particles [crosslinked polymer particles "Torayfill DY33-719" manufactured by Toray Dow Corning Corporation, refractive index: 1.42, volume average particle diameter: 2 μm], 2 parts by mass of a heat stabilizer ["Sumisorb 200" manufactured by Sumitomo Chemical Co., Ltd., powdered] and 2 parts by mass of a processing stabilizer ["Sumilizer GP" manufactured by Sumitomo Chemical Co., Ltd., powdered] were dry-blended, the resulting dry blend mixture was charged to a twin extruder through a hopper, kneaded with heat-melting, extruded into a strand shape at 250° C., and then cut into pellets to obtain a light diffusing agent master batch (pelletized).

Preparation of Coarse Particle-Containing Resin Composition 80 parts by mass of a styrene-methyl methacrylate copolymer resin ["MS200NT" manufactured by Nippon Steel Chemical Co., Ltd., content of styrene unit: 80% by mass, content of methyl methacrylate unit: 20% by mass, refractive index: 1.57] and 50 parts by mass of acryl-based polymer particles [crosslinked polymer particles "MBX80" manufactured by Sekisui Plastics Co., Ltd., refractive index: 1.49, volume average particle diameter: 80 μm] were dry-blended to obtain a coarse particle-containing resin composition.

Production of Multi-Layered Structure Light Diffuser Plate

After 95 parts by mass of polystyrene resin pellets ["HRM40" manufactured by TOYO-STYRENE CO., LTD., refractive index: 1.59] and 5 parts by mass of the light diffusing agent master batch obtained above were dry-blended, the resulting dry blend mixture was supplied to an extruder having a screw diameter of 40 mm and heated to 235° C. under a bent portion pressure of 5.3 kPa (absolute pressure) to obtain a light diffusing resin composition in a molten state. Separately, the coarse particle-containing resin composition obtained above was supplied to an extruder having a screw diameter of 20 mm and heated to 230° C. under a bent portion pressure of 21.3 kPa (absolute pressure) to obtain a coarse particle-containing resin composition in a molten state.

The light diffusing resin composition and the coarse particle-containing resin composition were transferred to a feed block (two-kind and three-layer configuration) and then coextruded through a T-die at a temperature of 245 to 250° C.

and a width of 220 mm to obtain a light diffuser plate [thickness: 2 mm, width: 220 mm] (31) with a three-layer configuration comprising a main layer [thickness: 1.9 mm] and a surface layer [thickness: 0.05 mm] laminated on both surfaces of the main layer, wherein both surfaces are rough surfaces. The ten-point average roughness (Rz) of the rough surface (31a) of the light diffuser plate (31) was 43.65 μm.

On one surface of a reflection type polarized light separating film (41) made of "DBEF-M" (thickness: 242 μm) manufactured by 3M Co., an adhesive sheet (adhesive is an acryl-based adhesive) was applied to form a 25 μm thick adhesive layer (40), and thus a laminated film (42) was obtained.

Thereafter, as shown in FIG. 3, the rough surface (31a) of the light diffuser plate and the adhesive layer (40) of the laminated film (42) were laid one upon another so as to contact with each other, followed by pressing to obtain a brightness enhancement film-laminated light diffuser plate (3) as shown in FIG. 2.

Comparative Example 1

In the same manner as in Example 1, except that a resin composition prepared by dry-blending 75 parts by mass of a styrene-methyl methacrylate copolymer resin ("MS200NT" manufactured by Nippon Steel Chemical Co., Ltd., styrene unit: 80% by mass, methyl methacrylate unit: 20% by mass, refractive index: 1.57) and 25 parts by mass of acryl-based polymer particles (crosslinked polymer particles "Sumipex XC1A" manufactured by Sumitomo Chemical Co., Ltd., refractive index: 1.49, volume average particle diameter: 25 μm) was used as the coarse particle-containing resin composition, a brightness enhancement film-laminated light diffuser plate (3) was obtained. The ten-point average roughness (Rz) of the rough surface (31a) of the light diffuser plate (31) was 13.94 μm.

Reference Example

On a rough surface having a ten-point average roughness (Rz) of 13.94 μm of a 2 mm thick light diffuser plate obtained in the same manner as in Comparative Example 1, a reflection type polarized light separating film ("DBEF-M" manufactured by 3M Co.) (thickness: 242 μm) was merely laid without using an adhesive to obtain a brightness enhancement film-laminated light diffuser plate.

The ten-point average roughness (Rz) is a value measured based on the following measuring method.

Method for Measurement of Ten-Point Average Roughness Rz

Using a measuring instrument "Surftest SJ-201P" manufactured by Mitsutoyo Corporation, a ten-point average roughness (Rz) was measured in accordance with JIS B0601-1994. The measurement is performed five times under measuring conditions of a measuring length of 2.5 mm. The measurement was performed three times each sample (Examples) and an average was taken as Rz.

The brightness enhancement film-laminated light diffuser plates thus obtained were evaluated by the following evaluation method. The results are shown in Table 1.

TABLE 1

|  | Example 1 | Comparative Example 1 | Reference Example |
| --- | --- | --- | --- |
| Lamination state of light diffuser plate and brightness enhancement film | Lamination | Lamination | laying |
| Ten-point average roughness Rz (μm) of laminated surface of light diffuser plate | 43.65 | 13.94 | 13.94 |
| Average brightness (cd/m$^2$) | 4,436 | 4,249 | 4,541 |

Method for Evaluation of Average Brightness

After removing a liquid crystal panel, various optical films and a light diffuser plate from a commercially available 20 inch type liquid crystal television set, each of the brightness enhancement film-laminated light diffuser plates (Examples and Comparative Examples) thus produced above was placed and fixed in a state of being contacted with the front surface of the rim of a lamp box (plural fluorescent tubes are disposed at a distance from each other in the lamp box), and then the open surface of the lamp was sealed. Using a multi-luminance meter ("Eye Scale-3WS) manufactured by I-System Co., Ltd.), brightness was measured in a state where the brightness enhancement film-laminated light diffuser plate is set.

The brightness was measured by the following manner. After disposing a liquid crystal television set on a floor surface in a dark room maintained at a constant temperature and a constant humidity (temperature: 25.0° C., humidity: 50.0%) while facing the front side upward (so as to contact the back surface with the floor surface), a camera was disposed downward at the position over the liquid crystal television set so that the entire front surface of the liquid crystal television set was visible. After setting the distance from the front surface of the liquid crystal television set to the camera of 120.0 cm, the entire range of the front surface of the liquid crystal television set was designated as a measuring spot and brightness at each measuring spot (51×51=2,601 positions) was measured under the measuring conditions of the multi-luminance meter (SPEED: 1/250, GAIN: 3, Stop: 16). An average of brightness was taken as average brightness (cd/m$^2$).

As is apparent from the results shown in Table 1, in the surface light source apparatus constituted using the brightness enhancement film-laminated light diffuser plate of Example 1 of the present invention, sufficiently high brightness could be obtained in the front direction (direction of the normal). High brightness thus obtained is nearly the same level as that of the configuration (air layer exists) in which a brightness enhancement film is merely laid on the light diffuser plate described in Reference Example). In the brightness enhancement film-laminated light diffuser plate of Example 1, since a light diffuser plate and a brightness enhancement film are bonded via an adhesive layer, the light diffuser plate and the brightness enhancement film do not rub against each other and scratching does not occur in the brightness enhancement film-laminated light diffuser plate.

In contrast, in a surface light source apparatus constituted using a brightness enhancement film-laminated light diffuser plate of Comparative Example 1, since a ten-point average roughness Rz of the laminated surface (rough surface) of the light diffuser plate is smaller than the defined range of the present invention, an air layer was almost not formed and sufficient brightness was not obtained.

The brightness enhancement film-laminated light diffuser plate of the present invention is suited for use as an optical member for a surface light source apparatus, but is not particularly limited to such an application. The surface light source apparatus of the present invention is suited for use as a backlight for a liquid crystal display but is not particularly limited to such an application.

What is claimed is:

1. A brightness enhancement film-laminated light diffuser plate comprising:
   a brightness enhancement film, and
   a light diffuser plate comprising a transparent material and a light diffusing agent dispersed in the transparent material, and having a rough surface having a ten-point average roughness (Rz) of more than 40 μm and 100 μm or less on at least one surface,
   wherein the brightness enhancement film is laminated and integrated on the rough surface of the light diffuser plate via an adhesive layer.

2. The brightness enhancement film-laminated light diffuser plate according to claim 1, wherein the brightness enhancement film is a reflection type polarized light separating film.

3. A surface light source apparatus comprising the brightness enhancement film-laminated light diffuser plate according to claim 2, and plural light sources disposed at the back side of the light diffuser plate, wherein the brightness enhancement film is disposed at the front side in the light diffuser plate.

4. A liquid crystal display comprising the brightness enhancement film-laminated light diffuser plate according to claim 2, plural light sources disposed at the back side of the light diffuser plate, and a liquid crystal panel disposed at the front side of the light diffuser plate, wherein the brightness enhancement film is disposed at the front side in the light diffuser plate.

5. A surface light source apparatus comprising the brightness enhancement film-laminated light diffuser plate according to claim 1, and plural light sources disposed at the back side of the light diffuser plate, wherein the brightness enhancement film is disposed at the front side in the light diffuser plate.

6. A liquid crystal display comprising the brightness enhancement film-laminated light diffuser plate according to claim 1, plural light sources disposed at the back side of the light diffuser plate, and a liquid crystal panel disposed at the front side of the light diffuser plate, wherein the brightness enhancement film is disposed at the front side in the light diffuser plate.

7. A method for producing a brightness enhancement film-laminated light diffuser plate, which comprises the steps of:
   producing a light diffuser plate comprising a transparent material and a light diffusing agent dispersed in the transparent material, and having a rough surface having a ten-point average roughness (Rz) of more than 40μm and 100μm or less on at least one surface,
   producing a laminated film comprising a brightness enhancement film and an adhesive layer laminated on one surface of the brightness enhancement film, and
   laying the rough surface of the light diffuser plate and the adhesive layer of the laminated film one upon another so as to contact with each other, thereby laminating and integrating the light diffuser plate and the laminated film.

* * * * *